(12) United States Patent
Takada et al.

(10) Patent No.: US 7,718,263 B2
(45) Date of Patent: May 18, 2010

(54) AQUEOUS PRIMER COMPOSITION, METHOD OF SURFACE TREATING BY USING THE SAME AND LAMINATED STRUCTURE THEREOF

(75) Inventors: Yasuhiro Takada, Osaka (JP); Hideto Hayano, Osaka (JP); Masaki Watanabe, Osaka (JP); Masahito Furo, Carlstadt, NJ (US)

(73) Assignee: DIC Corporation, Tokyo (JP)

( * ) Notice: Subject to any disclaimer, the term of this patent is extended or adjusted under 35 U.S.C. 154(b) by 748 days.

(21) Appl. No.: 11/587,660

(22) PCT Filed: Aug. 15, 2005

(86) PCT No.: PCT/JP2005/014922

§ 371 (c)(1),
(2), (4) Date: Oct. 26, 2006

(87) PCT Pub. No.: WO2006/019080

PCT Pub. Date: Feb. 23, 2006

(65) Prior Publication Data

US 2007/0178313 A1    Aug. 2, 2007

(30) Foreign Application Priority Data

Aug. 19, 2004   (JP) .............................. 2004-239468

(51) Int. Cl.
*B32B 27/38* (2006.01)
*B32B 27/40* (2006.01)
*B05D 3/00* (2006.01)

(52) U.S. Cl. .................. 428/414; 428/423.1; 428/522; 427/484; 528/44

(58) Field of Classification Search .............. 428/423.1, 428/522, 414; 524/507; 528/44; 427/384
See application file for complete search history.

(56) References Cited

U.S. PATENT DOCUMENTS

| 5,691,417 A | 11/1997 | Bremer et al. |
| 7,150,899 B2 * | 12/2006 | Onoyama et al. ........... 427/470 |
| 2002/0143101 A1 | 10/2002 | Probst et al. |
| 2003/0069353 A1 | 4/2003 | Suganuma et al. |

FOREIGN PATENT DOCUMENTS

| GB | 2362387 | 11/2001 |
| JP | 6-92756 | 4/1994 |
| JP | 9-25452 | 1/1997 |
| JP | 2000-265053 | 9/2000 |
| JP | 2002-241674 | 8/2002 |
| JP | 2004-10777 | 1/2004 |
| JP | 2004-196914 | 7/2004 |
| JP | 2004-352780 | 12/2004 |

OTHER PUBLICATIONS

Supplementary European Search Report dated Jun. 2, 2009, issued on the corresponding European patent application No. 05780199.5.

* cited by examiner

*Primary Examiner*—Thao T. Tran
(74) *Attorney, Agent, or Firm*—Edwards Angell Palmer & Dodge LLP

(57) ABSTRACT

An aqueous primer composition of the present invention includes a water-dispersible polyisocyanate (A) and an acrylic resin water dispersion (B), wherein a polystyrene equivalent weight average molecular weight, determined using gel permeation chromatography, of an acrylic resin in the acrylic resin water dispersion (B) is 350,000 or more, and a glass transition temperature, determined by using a differential scanning calorimeter, of the acrylic resin is 15° C. to 130° C., and a weight ratio between the water-dispersible polyisocyanate (A) and the acrylic resin water dispersion (B) is (A):(B)=70:30 to 50:50.

8 Claims, No Drawings

US 7,718,263 B2

AQUEOUS PRIMER COMPOSITION, METHOD OF SURFACE TREATING BY USING THE SAME AND LAMINATED STRUCTURE THEREOF

TECHNICAL FIELD

The present invention relates to a two-pack aqueous primer composition used in civil engineering and construction, a method for surface-treating inorganic substrates used in civil engineering and construction by using the same, and a laminated structure thereof. More specifically, the present invention relates to an odorless aqueous primer composition used for surface-treating the inorganic substrates of concrete, asphalt, or the like which are applied to roofs, walls, floors, roads, or the like. The aqueous primer composition of the present invention can solve the odorous problem in the process of the surface treatment, can speed up the process, and is also excellent in adhesiveness to all inorganic substrates and in its effect to prevent covering resin layers from bulging, and drying property. Also, the present invention relates to a method of surface-treating by using this aqueous primer composition, and a laminated structure thereof.

BACKGROUND ART

In general, a covering resin layer of a waterproofing material, coated flooring material, sealing material, or the like is often provided in constructions formed with inorganic substrates such as mortar and concrete in order to prevent the inorganic substrates from corroding or deteriorating, and a primer is used as a surface-treating agent to improve the adhesiveness of the covering resin layer.

As typical examples of primers used in civil engineering and construction, those based on a urethane resin, epoxy resin, or the like can be mentioned. However, there has been concern about not only hazardous effects to the workers but also the indoor air pollution (a sick house) and the general air pollution. Therefore, it has been expected to reduce the use of the organic solvent therein by developing an aqueous primer, among others.

A primer used in the methods of waterproofing and floor-coating should be excellent not only in drying property directly after coating but also in basic properties such as permeability, shielding property, and adhesiveness to an inorganic substrate, and in durability such as water-proof adhesiveness. However, no aqueous primers having such properties have been developed although the organic solvent-based primers having these properties have been developed.

In general, aqueous resins can be classified into a water-soluble resin, and water-dispersible resin, which has a form of particles. The water-dispersible resin, in particular, the emulsion in which the particle diameter is large, is suitable in terms of the drying property at ordinary temperature, and the water-soluble resin is preferable in terms of its permeability to the inorganic substrates. That is, if the aqueous resin is used as a primer, it is difficult for the single water-soluble resin or the single water-dispersible resin to have all the required properties. Furthermore, tough hardening due to the cross-linking is required to impart durability such as water-proof adhesiveness.

In order to achieve these demands, a method in which an aqueous resin capable of cross-linking is used for surface-treating the inorganic substrate has been proposed. For example, a method in which an emulsifiable isocyanate prepolymer having hydrophilic groups is used for surface-treating by diluting with water (for example, see patent documents 1 and 2). This method is excellent in terms of not requiring an organic solvent, the impregnation into a porous inorganic substrate, and the reinforcement of the surface of the substrate. However, this method has a problem in which, if the isocyanate prepolymer is used for the method of water-proofing or floor coating, its drying is too slow to quickly go about the next step. Also, there is a problem in which covering resin layers of a water-proofing material, floor coating material or the like, which are coated thereon, are likely to be affected by the water content included in the bedding concrete and bulging is likely to be generated because they are inferior in shielding property.

A method in which an aqueous primer composition which includes an emulsifiable isocyanate prepolymer having hydrophilic groups and an emulsified resin solution is used for surface-treating, has been disclosed (for example, see patent document 3).

This method is excellent in terms of not requiring an organic solvent, the impregnation into a porous inorganic substrate, and the reinforcement of the surface of the substrate. However, this method has a problem in which, if it is used for the method of water-proofing or floor-coating, covering resin layers of a water-proofing material, floor-coating material, or the like, which are coated thereon, are likely to be affected by the water content included in the bedding concrete and bulging is likely to be generated because the molecular weight of the emulsified resin is small, so that they are inferior in shielding property. Also, this method has a problem in which its drying is too slow to quickly go about the next step in the case of the porous inorganic substrate which is not preheated with a hot air drying machine or the like.

An aqueous resin composition has been disclosed, which is made by combining three of an aqueous acrylate resin having hydroxyl groups and cross-linked structures, an aqueous urethane resin having hydroxyl groups and cross-linked structures, and a polyisocyanate compound dispersible in water (for example, see patent document 4). The coating materials made up of this composition are excellent in adhesiveness to resin substrates such as a urethane sheet, water-resistance, and water-resistant adhesiveness, but their permeability to inorganic substrates is low and their adhesiveness also tends to be inferior because their contents of the aqueous acrylate resin having hydroxyl groups are high.

Patent Document 1: Japanese Unexamined Patent Application, Publication No. H6-92756

Patent Document 2: Japanese Unexamined Patent Application, Publication No. 2004-010777

Patent Document 3: Japanese Unexamined Patent Application, Publication No. 2004-196914

Patent Document 4: Japanese Unexamined Patent Application, Publication No. 2000-265053

DISCLOSURE OF THE INVENTION

Problems to Be Solved by the Present Invention

An object of the present invention is to provide an aqueous primer composition which can alleviate the odorous problem in the process of surface-treating the inorganic substrates used for constructions such as roofs, walls, floors, and roads, and which can also speed up the process, and which is further excellent in adhesiveness to every inorganic substrate, in its effect to prevent the coating resin layers from bulging, and in drying property. Also, an object of the present invention is to provide a method of surface-treating by using the same, and a laminated structure thereof.

Means for Solving the Problems

The inventors studied on the above-described problems. Consequently, they discovered that an aqueous primer composition which includes, as essential components, a water-dispersible polyisocyanate (A), and an acrylic resin water dispersion (B) having a predetermined molecular weight and glass transition temperature was less odorous and excellent in drying property. Also, they discovered that this was excellent in its adhesiveness to the substrate because its permeability to every inorganic substrate was preferable and it is possible to be strengthened due to cross-linking. Furthermore, they discovered that bulging of covering resin layers to be coated thereon did not occur because this was excellent in shielding property. As a result, this resulted in the present invention.

That is, an aspect of the present invention is to provide an aqueous primer composition including a water-dispersible polyisocyanate (A) and an acrylic resin water dispersion (B) as essential components, wherein the polystyrene equivalent weight average molecular weight, determined using gel permeation chromatography, of the acrylic resin in the acrylic resin water dispersion (B) is 350,000 or more, the glass transition temperature, determined by using a differential scanning calorimeter, of the acrylic resin is 15° C. to 130° C., and the weight ratio between the water-dispersible polyisocyanate (A) and the acrylic resin water dispersion (B) is (A):(B)= 70:30 to 50:50 in the solid content.

Yet another aspect of the present invention is to provide a method of surface-treating an inorganic substrate, wherein the inorganic substrate is coated with the above-described aqueous primer composition.

Yet another aspect of the present invention is to provide a laminated structure which includes at least three layers of an inorganic substrate layer, a resin layer formed with the above-described aqueous primer composition, and a covering resin layer including any one of an epoxy resin, a urethane resin, a polymerizable unsaturated resin.

In addition, "(meth)acrylic acid" is a general term for "acrylic acid" and "methacrylic acid", and "(meth)acrylate" also is a general term for "acrylate" and "methacrylate" in the present application.

EFFECTS OF THE INVENTION

The aqueous primer composition of the present invention can alleviate the odorous problem in the process of surface-treating, and can speed up the process. The aqueous primer composition of the present invention is useful for surface-treating inorganic substrates used in civil engineering and construction such as roofs, walls, floors, and roads because it is excellent in adhesiveness to every inorganic substrate, and its effect to prevent the coating resin layers from bulging, and drying property. Accordingly, the aqueous primer composition of the present invention can provide a highly reliable laminated structure.

BEST MODE FOR CARRYING OUT THE INVENTION

Hereinafter, the present invention is explained in detail.

Firstly, a water-dispersible polyisocyanate (A) used in the present invention is explained.

The water-dispersible polyisocyanate (A) used in the present invention is a polyisocyanate which can form a water dispersion when it is stirred into water and examples include known conventional water-dispersible polyisocyanates. Their content of isocyanate groups is preferably 10% to 30% by weight, more preferably 10% to 20% by weight.

As examples of the known conventional water-dispersible polyisocyantates, (1) a mixture of a hydrophobic polyisocyanate and a polyisocyanate having hydrophilic groups, (2) a mixture of a hydrophobic polyisocyanate, and a dispersing agent having no isocyanate group but having hydrophilic groups, and (3) a polyisocyanate having hydrophilic groups can be mentioned. In particular, the water-dispersible polyisocyanate of (1) is preferable in terms of bulging-resistant property, among others.

The above-mentioned hydrophobic polyisocyanates (A1) are those having no general hydrophilic group such as an anionic group, cationic group, and nonionic group in their molecules. For example, the hydrophobic polyisocynates (A1) include aliphatic diisocyanates such as 1,4-tetramethylene diisocyanate, ethyl(2,6-diisocyanato)hexanoate, 1,6-hexamethylene diisocyanate (hereinafter, abbreviated as "HDI"), 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, and 2-isocanatoethyl(2,6-diisocyanato)hexanoate;

Alicyclic diisocyanates such as 1,3- or 1,4-bis(isocyanatomethyl)cyclohexane, 1,3- or 1,4-diisocyanatocyclohexane, 3,5,5-trimethyl(3-isocyanatomethyl)cyclohexyl isocyanate, dicyclohexylmethane-4,4'-diisocyanate, and 2,5- or 2,6-diisocyanatomethyl norbornane; alicyclic triisocyanates such as 2,5- or 2,6-diisocyanatomethyl-2-isocyanatepropyl norbornane; aralkylene diisocyanates such as m-xylylene diisocyanate, and α,α,α',α'-tetramethyl-m-xylylene diisocyanate;

Aromatic diisocyanates such as m- or p-phenylene diisocyanate, tolylene-2,4- or 2,6-diisocyanate, diphenylmethane-4,4'-diisocyanate, naphthalene-1,5-diisocyante, diphenyl-4, 4'-diisocyanate, 4,4'-diisocyanto-3,3'-dimethyldiphenyl, 3-methyl-diphenylmethane-4,4'-diisocyante, and diphenylether-4,4'-diisocyanate; aromatic triisocyanates such as triphenylmethane triisocyanate; and tris(isocyanatophenyl) thiophosphate;

Polyisocyanates having a urethodione structure obtained by cyclizing and dimerizing isocyanate groups in the above-described diisocyanates or triisocyantes; polyisocyanates having an isocyanurate structure obtained by cyclizing and trimerizing isocyanate groups in the above-described diisocyanates or triisocyantes; polyisocyanates having a bullet structure obtained by reacting the above-described diisocyanates or triisocyantes with water; polyisocyanates having a oxa-diazin-trion-structure obtained by reacting the above-described diisocyanates or triisocyantes with carbon dioxide; polyisocyanates having an allophanate structure; or the like.

The hydrophilic groups of the above-mentioned polyisocyanate (A2) having hydrophilic groups, for example, include anionic groups, cationic groups, and nonionic groups which are known and common. In the case of the aqueous primer composition of the present invention, it is preferable that the hydrophilic group be a nonionic group, and it is more preferably a polyoxyethylene group in terms of shielding property.

The above-mentioned polyisocyanate (A2) having hydrophilic groups, for example, is a polymer having the above-mentioned hydrophilic and isocyanate groups. The polymer, for example, includes a polyether, polyester, polyurethane, vinyl polymer, alkyd resin, fluororesin, silicone resin, and the like. In particular, it is preferable that polyether or vinyl polymer having hydrophilic groups and isocyanate groups be used in terms of water-dispersibility. These can be used alone or as a mixture of two or more kinds.

With regards to the polyisocyanate (A2) having hydrophilic groups used in the present invention, the polyether having hydrophilic groups and isocyanate groups is explained hereinafter.

The polyether having hydrophilic groups and isocyanate groups, for example, can be produced by reacting a polyether compound having both of hydrophilic groups and active-hydrogen-containing groups with the above-described hydrophobic polyisocyanate.

As examples of the polyether compounds having both of hydrophilic groups and active-hydrogen-containing groups, among others, polyethers having hydroxyl groups such as monoalkoxy polyoxyethylene glycol, monoalkoxy polyoxyethylene-polyoxypropylene glycol, polyoxyethylene glycol, polyoxyethylene-polyoxypropylene glycol can be mentioned. These may be used alone or as a mixture of two or more kinds.

The above-mentioned polyether having hydrophilic groups and isocyanate groups, namely a mixture of the polyisocyanate having hydrophilic groups, and the hydrophobic polyisocyanate can be produced through one reaction by using an excessive amount of the hydrophobic polyisocyanate with respect to the above-described polyether compound having both of hydrophilic groups and active-hydrogen-containing groups when the above-described polyether having hydrophilic groups and isocyanate groups is produced.

Also, it is preferable that hydrophobic groups having three or more carbon atoms be incorporated into the above-described polyether having hydrophilic groups and isocyanate groups. This makes it possible to sufficiently extend the working life of the aqueous primer composition of the present invention.

The hydrophobic groups having three or more carbon atoms, for example, include an alkyl group such as n-propyl group, iso-propyl group, n-butyl group, and hexyl group; an alicyclic alkyl group such as cyclopentyl group, and cyclohexyl group; an aromatic group such as phenyl group; or the like.

As an example of a method of incorporating the hydrophobic groups having three or more carbon atoms into the above-described polyether having hydrophilic groups and isocyanate groups, a method wherein the above-described polyether compound having both of hydrophilic groups and active-hydrogen-containing groups; a compound having a hydrophobic group which includes three or more carbon atoms, and an active-hydrogen-containing group; and the hydrophobic polyisocyanate are reacted can be mentioned.

It is particularly preferable that the polyisocyanate having hydrophilic groups used in the present invention be a vinyl polymer having isocyanate groups and hydrophilic groups.

The vinyl polymer, for example, includes an acrylic polymer, fluoroolefin polymer, vinyl ester polymer, aromatic vinyl polymer, polyolefin polymer, or the like. In particular, it is preferable that the acrylic polymer having hydrophilic groups and isocyanate groups be used in terms of its compatibility with the acrylic resin water dispersion (B) described below which is used in the aqueous primer composition of the present invention.

The above-described vinyl polymer having hydrophilic groups and isocyanate groups can be produced, for example, a) by polymerizing a vinyl monomer having isocyanate groups with a vinyl monomer having hydrophilic groups, or b) by reacting a vinyl polymer having active-hydrogen-containing groups which is obtained by polymerizing a vinyl monomer having active-hydrogen-containing groups with a vinyl monomer having hydrophilic groups; and a polyisocyanate.

As examples of the vinyl monomers having isocyanate groups used in the above-described production method a), among others, a reaction product of a vinyl monomer having hydroxyl groups with 2-isocyanato propene, 2-isocyanatoethyl vinyl ether, 2-isocyanatoethyl methacrylate, m-isopropenyl-α, α-dimethylbenzyl isocyanate, polyisocyanate can be mentioned.

As examples of the vinyl monomers having hydrophilic groups used in the above-described production method a), among others, vinyl monomers having alkoxy-polyoxyethylene groups such as methoxypolyethylene glycol (meth)acrylate, butoxypolyethylene glycol (meth)acrylate, methoxypolyoxyethylenevinyl; and vinyl monomers having anionic groups such as sodium alkylaryl sulfonate, sodium alkylaryl phosphate can be mentioned.

As examples of the active-hydrogen-containing groups of the vinyl monomers used in the above-described production method b), a hydroxyl group, amino group, carboxyl group, phosphate group, phosphite group, sulfonate group, sulfinate group, mercapto group, silanol group, activated methylene group, carbamate group, ureido group, carboxylic acid amide group, sulfonic acid amide group, or the like can be mentioned. In particular, a hydroxyl group, amino group, carboxyl group, and activated methylene group are preferable because it is easy to incorporate the active-hydrogen-containing groups into the vinyl polymer. A hydroxyl group and carboxyl group are more preferable. The active-hydrogen-containing groups may be incorporated into the vinyl polymer as a single functional group, or as two or more functional groups.

As examples of the vinyl monomers having the active-hydrogen-containing groups used in the above-described production method b), acrylate monomers such as 2-hydroxyethyl acrylate, 2-hydroxyethyl methacrylate, 2-hydroxypropyl methacrylate can be mentioned. Also, those used in the above-described production method a) can be used therein as the vinyl monomers having hydrophilic groups.

In the production methods a) and b), vinyl monomers having a hydrophobic group which includes four or more carbon atoms can be used in combination. The use of the vinyl monomers can prevent the water-dispersible polyisocyanate from reacting with water and this can attain a sufficient working life of the aqueous primer composition of the present invention.

As an example of a method of incorporating a hydrophobic group having four or more carbon atoms into the vinyl polymer having a hydrophilic group and isocyanate group, a method in which vinyl monomers having a hydrophobic group which includes four or more carbon atoms are copolymerized with other vinyl monomers in the above-described production method a) or b) can be mentioned.

As examples of the above-described vinyl monomers having a hydrophobic group which includes four or more carbon atoms, those which have an alkyl group having four or more carbon atoms such as an n-butyl group, iso-butyl group, tert-butyl group, n-pentyl group, n-hexyl group, 2-ethylhexyl group, n-octyl group, n-dodecyl group and n-octadecyl group; and/or a cycloalkyl group having four or more carbon atoms such as a cyclopentyl group, cyclohexyl group, cyclooctyl group, dicyclopentanyl group, bornyl group, and isobornyl group can be mentioned. For example, acrylate monomers such as n-butyl acrylate, and n-butyl methacrylate can be mentioned.

With regard to the above-described vinyl polymer having hydrophilic groups and isocyanate groups, the other vinyl monomers can be used in addition to the above-described vinyl monomers as long as the object of the present invention can be achieved.

As examples of the other vinyl monomers, acrylic monomers such as methyl acrylate and methyl methacrylate can be mentioned.

The weight average molecular weight of the vinyl polymer having hydrophilic groups and isocyanate groups obtained in this way is preferably within the range of 2,000 to 100,000, more preferably within the range of 3,000 to 50,000.

If a mixture of the above-described vinyl polymer having hydrophilic groups and isocyanate groups, and the above-described hydrophobic polyisocyanate is used as the water-dispersible polyisocyanate (A) of the present invention, the weight ratio between these (vinyl polymer having hydrophilic groups and isocyanate groups (A2)/hydrophobic polyisocyanate (A1)) is preferably within the range of 0.5/9.5 to 7/3, more preferably within the range of 1/9 to 5/5, most preferably within the range of 2/8 to 4/6.

The above-mentioned mixture of the vinyl polymer having hydrophilic groups and isocyanate groups (A2), and the hydrophobic polyisocyanate (A1) can be produced through one reaction by using an excessive amount of the hydrophobic polyisocyanate in the above-described production method a) or b).

The above-mentioned dispersing agent having no isocyanate groups but having hydrophilic groups, for example, includes vinyl polymers obtained by using the above-described vinyl monomers other than the vinyl monomers having isocyanate groups and the vinyl monomers having active-hydrogen-containing groups.

As a water-dispersible polyisocyanate (A), the above-described polyisocyanate having hydrophilic groups and the above-described dispersing agent having no isocyanate groups but having hydrophilic groups can be used in combination in addition to the above-described hydrophobic polyisocyanate. In this case, the weight ratio of the polyisocyanate having hydrophilic groups (A2) and the dispersing agent having no isocyanate groups but having hydrophilic groups with respect to the hydrophobic polyisocyanate [(polyisocyanate having hydrophilic groups+dispersing agent having no isocyanate groups but having hydrophilic groups)/hydrophobic polyisocyanate] is preferably within the range of 0.5/9.5 to 7/3, more preferably within the range of 1/9 to 5/5, most preferably within the range of 2/8 to 4/6.

Also, the above-described polyisocyanate having hydrophilic groups can be used by diluting it with an organic solvent which is inactive to the isocyanate groups as long as this can achieve the object of the present invention.

The above-mentioned organic solvent, for example, includes aliphatic or alicyclic hydrocarbons such as n-hexane, n-heptane, n-octane, cyclohexane, cyclopentane; aromatic hydrocarbons such as toluene, xylene, ethylbenzene; esters such as ethyl acetate, n-butyl acetate, n-amyl acetate, ethylene glycol monomethyl ether acetate; ketones such as acetone, methyl ethyl ketone, methyl isobutyl ketone, methyl n-amyl ketone, cyclohexanone;

Polyalkylene glycol dialkyl ethers such as diethylene glycol dimethyl ether, diethylene glycol diethyl ether, diethylene glycol dibutyl ether, dipropylene glycol dimethyl ether; polyalkylene glycol monoalkyl ether acetates such as ethylene glycol methyl ether acetate, propylene glycol methyl ether acetate, diethylene glycol methyl ether acetate; ethers such as 1,2-dimethoxyethane, tetrahydrofuran, dioxane; N-methylpyrrolidone, dimethylformamide, dimethylacetamide, ethylene carbonate, or the like. These can be used alone or as a mixture of two or more kinds.

Next, the acrylic resin water dispersion (B) used in the present invention is explained.

The polystyrene equivalent weight average molecular weight of the acrylic resin in the acrylic resin water dispersion (B) determined using gel permeation chromatography is 350,000 or more, and the glass transition temperature of the acrylic resin determined by using a differential scanning calorimeter is 15° C. to 130° C.

The acrylic resin water dispersion (B) used in the present invention is one in which the acrylic resin is dispersed in an aqueous medium. For example, known and common acrylic resin water dispersions can be mentioned. In general, they can be classified into (1) those in which the acrylic resin is dispersed in an aqueous medium with a dispersing agent such as an emulsifying agent, and (2) those in which the acrylic resin having hydrophilic groups is dispersed in an aqueous medium.

For example, the above-mentioned acrylic resin water dispersion of (1) in which the acrylic resin is dispersed in an aqueous medium with a dispersing agent such as an emulsifying agent includes an emulsion of acrylic resins, namely those obtained by emulsion-polymerizing general acrylic monomers in an aqueous medium in the presence of an emulsifying agent.

The acrylic monomers include, for example, (meth)acrylic acids, alkali metal salts of (meth)acrylic acids, (meth)acrylic acid esters, (meth)acrylonitrile, N,N-dimethyl (meth)acrylamide, 2-hydroxyethyl (meth)acrylate, 3-(meth)acryloxypropyltrimethoxysilane, 2-dimethylaminoethyl (meth)acrylate, glycidyl (meth)acrylate or the like. Also, according to necessity, vinyl monomers other than acrylic monomers can be used.

The emulsifying agents used in the emulsion-polymerization, for example, include nonionic emulsifying agents (polyoxyethylene alkyl ethers; polyoxyethylene alkylphenyl ethers; polyoxyethylene-polyoxypropylene copolymers; or the like), anionic emulsifying agents (alkyl sulfuric acid ester salts; alkylbenzene sulfonates; polyoxyethylene alkyl ether sulfate ester salts; polyoxyethylene alkylphenyl ether sulfate ester salts; or the like), cationic emulsifying agents (quaternary ammonium salts; or the like). It is preferable that 0.1% to 10% by weight of the emulsifying agent be used with respect to the total weight of the monomers. Furthermore, it can be used more preferably within the range of 0.1% to 5% by weight in terms of shielding property of the aqueous primer composition of the present invention.

With regard to the above-mentioned emulsion-polymerization method, the radical emulsion-polymerization method in which a radical-polymerization initiator is used is particularly easy and useful. In this case, the radical-polymerization initiators used therein include, for example, persulfates such as potassium persulfate, sodium persulfate, and ammonium persulfate; azo compounds such as 2,2'-azobisisobutyronitrile, and dimethyl-2,2'-azobisisobutyrate; organic peroxides such as benzoyl peroxide, and tert-butylperoxy-2-ethylhexanoate; redox initiators in which organic peroxides such as cumene hydroperoxide are combined with reducing agents such as an iron oxide; or the like. The usage of these radical-polymerization initiators is usually within the range of 0.01% to 5% by weight, preferably within the range of 0.05% to 2% by weight with respect to the total weight of the monomers.

In addition to the above-described acrylic monomers, emulsifying agents, and radical-polymerization initiators, according to necessity, chain transfer agents, pH adjustors, and the like can be used in combination, and the objective acrylic-resin emulsion can be obtained by conducting an emulsion-polymerization reaction for 0.1 to 10 hours at the temperature of 5° C. to 100° C., preferably 50° C. to 90° C. in 100% to 500% by weight of water with respect to the total weight of the monomers.

With regard to the acrylic resin water dispersion (B) used in the present invention, the above-mentioned acrylic resin water dispersion of (2) in which an acrylic resin having hydrophilic groups is dispersed in an aqueous medium can be obtained by dispersing the acrylic resin having hydrophilic groups in the aqueous medium.

The acrylic resin having hydrophilic groups, for example, includes those having hydrophilic groups such as anionic groups, cationic groups, nonionic groups, or the like.

The anionic groups, for example, include a carboxyl group, phosphate group, acidic phosphoric acid ester group, phosphite group, sulfonate group, sulfinate group, or the like. It is preferable that those in which these are neutralized with a basic compound be used.

The above-mentioned basic compound used for neutralizing the anionic groups, for example, includes methylamine, dimethylamine, trimethylamine, ethylamine, diethylamine, triethylamine, 2-aminoethanol, 2-dimethylaminoethanol, ammonia, sodium hydroxide, potassium hydroxide, tetramethylammonium hydroxide, tetra-n-butylammonium hydroxide, trimethylbenzylammonium hydroxide, or the like.

The cationic groups, for example, include primary amino groups, secondary amino groups, tertiary amino groups, ammonium hydroxide groups, or the like. It is preferable that those in which these cationic groups are neutralized with acidic compounds be used.

The acidic compounds, for example, include formic acid; acetic acid; propionic acid; lactic acid; phosphoric acid, monomethyl ester; methansulfonic acid; benzene sulphonic acid; dodecylbenzenesulfonic acid; hydrochloric acid; sulfuric acid; nitric acid; or the like.

The nonionic groups, for example, include those having polyether chains such as a polyoxyethylene and polyoxypropylene.

The acrylic resin having hydrophilic groups can be produced, for example, by polymerizing acrylic monomers having hydrophilic groups.

As examples of the acrylic monomers having hydrophilic groups, acrylic monomers having carboxylic groups such as (meth)acrylic acid and 2-carboxyethyl (meth)acrylate, or alkali metal salts thereof, etc.; (meth)acrylamides having tertiary amino groups such as N,N-dimethyl (meth)acrylamide; (meth)acrylic acid esters having tertiary amino groups such as dimethylaminoethyl (meth)acrylate, or quaternary compounds thereof, etc. In particular, (meth)acrylic acids or dimethylaminoethyl (meth)acrylates are preferable. These can be used alone or as a mixture of two or more kinds.

As examples of methods of preparing the acrylic resin having hydrophilic groups by using the above-described monomers, common and known polymerization methods can be mentioned. However, the method of solution radical polymerization by using an organic solvent is the easiest and useful. In this case, the organic solvents, for example, include aliphatic or alicyclic hydrocarbons such as n-hexane, n-heptane, n-octane, cyclohexane, and cyclopentane; aromatic hydrocarbons such as toluene, xylene, and ethylbenzene; esters such as ethyl acetate, n-butyl acetate, n-amyl acetate, ethylene glycol monomethyl ether acetate, ethylene glycol monoethyl ether acetate, and ethylene glycol monobutyl ether acetate; alcohols such as methanol, ethanol, iso-propanol, n-butanol, iso-butanol, ethylene glycol monomethyl ether, ethylene glycol monoethyl ether, ethylene glycol mono-n-butyl ether, propylene glycol monomethyl ether, propylene glycol mono-n-propyl ether, and diethylene glycol monobutyl ether; ketones such as acetone, methyl ethyl ketone, methyl isobutyl ketone, methyl n-amyl ketone, and cyclohexanone; ethers such as dimethoxyethane, tetrahydrofuran, dioxane, ethylene glycol dimethyl ether, ethylene glycol dibutyl ether, diethylene glycol dimethyl ether, and diethylene glycol dibutyl ether; N-methylpyrrolidone, dimethylformamide, dimethylacetoamide, ethylene carbonate, or the like. These can be used alone or as a mixture of two or more kinds.

Also, as examples of the radical-polymerization initiators used in the above-mentioned method of the solution radical polymerization, known and general compounds can be used. Typical examples include azo compounds such as 2,2'-azobis (isobutylnitrile), 2,2'-azobis(2,4-dimethylvaleronitrile); peroxides such as tert-butyl peroxypivalate, tert-butyl peroxybenzoate, tert-butylperoxy-2-ethyl hexanoate; or the like.

In addition to the above-described acrylic monomers having hydrophilic groups, according to necessity, the other acrylic monomers that are coporimerizable with them can be used in combination. Typical examples of such other acrylic monomers coporimerizable with the above-described acrylic monomers include alkyl esters of (meth)acrylic acids such as methyl (meth)acrylate, ethyl (meth)acrylate, n-butyl (meth) acrylate, and cyclohexyl (meth)acrylate.

The objective acrylic resin having hydrophilic groups can be prepared by using the above-mentioned monomers, polymerization initiators, and organic solvents by way of the common method of solution radical polymerization.

As examples of the methods of dispersing the obtained acrylic resin having hydrophilic groups in an aqueous medium, general methods can be mentioned, but it is particularly preferable that they be dispersed by using the method of phase-inversion emulsification.

In the method of phase-inversion emulsification, according to necessity, the hydrophilic groups of the acrylic resin are neutralized with a basic or acidic compound, and then, the resin is dispersed in an aqueous medium.

If the hydrophilic groups of the acrylic resin are cationic groups, the method in which they are neutralized with the above-described acidic compound, and water is then added therein after the acrylic resin is dissolved in an organic solvent is preferable.

If the hydrophilic groups of the acrylic resin are anionic groups, the method in which they are neutralized with the above-described basic compound, and water is then added therein after the acrylic resin is dissolved in an organic solvent is preferable.

In the method of phase-inversion emulsification, according to the necessity, emulsifying agents can be used as long as this can achieve the object of the present invention.

The emulsifying agents, for example, include nonionic emulsifying agents (polyoxyethylene alkyl ethers; polyoxyethylene alkylphenyl ethers; polyoxyethylene-polyoxypropylene copolymers; or the like), anionic emulsifying agents (alkyl sulfuric acid ester salts; alkylbenzene sulfonates; polyoxyethylene alkyl ether sulfate ester salts; polyoxyethylene alkylphenyl ether sulfate ester salts; or the like), cationic emulsifying agents (quaternary ammonium salts; or the like).

As examples of the aqueous medium, water and water containing an organic solvent can be mentioned.

As examples of the organic solvent, those described as organic solvents used for the method of solution radical polymerization can be used, but esters, ketones, and ethers are particularly preferable. These organic solvents in the aqueous medium may be used alone or as a mixture of two or more kinds. The mixing ratio is preferably 1% to 40% by weight, more preferably 1% to 20% by weight, and most preferably 1% to 10% by weight in the aqueous medium.

It is preferable that the solid acrylic resin content of the acrylic resin water dispersion obtained in this way be 1% to 20% by weight.

In terms of drying property and shielding property, it is necessary for the polystyrene-equivalent weight average molecular weight of the acrylic resin in the acrylic resin water dispersion (B) used in the present, determined by using gel permeation chromatography, to be 350,000 or more, preferably 400,000 or more.

The molecular weight of the acrylic resin in the acrylic resin water dispersion (B) is high, so that it is often insoluble in an organic solvent such as tetrahydrofuran (hereinafter, abbreviated as "THF"). The most of the insoluble portion in the organic solvent such as THF is ultrahigh molecular weight content above the detection limit and its weight average molecular weight is at least 500,000 or more. Therefore, the insoluble portion in the organic solvent such as THF can be reasonably considered as ultrahigh molecular weight content above the detection limit. The calculations of the quantities of the molecular weight contents in the present specification are carried out based on such considerations.

Also, the polystyrene-equivalent weight average molecular weight is measured by using a general gel permeation chromatography analyzer under the following conditions.

Column temperature: 40° C.
Solvent: THF
Flowing rate: 1.0 ml/minute
Detector: RI (refractive index detector)

For the purpose of obtaining the acrylic resin water dispersion (B) complying with the above-described requirement of the molecular weight, the method of controlling the generation of radicals derived from the polymerization initiator with respect to the vinyl monomers present in the system of the polymerization is useful.

From this point, 1) the method of decreasing the usage of the polymerization initiator; 2) the method of polymerizing at low temperature, in which, for example, (2a) the acrylic resin is polymerized by using a redox intiator at 50° C. or less when the acrylic resin is dispersed in the aqueous medium with a dispersing agent such as an emulsifying agent, and (2b) the acrylic resin having hydrophilic groups is polymerized at 80° C. or less when the acrylic resin having hydrophilic groups is dispersed in the aqueous medium; 3) the method of extending the period of the polymerization; among others can be mentioned. Any one of these methods or the combination of these methods is effective.

Also, for the purpose of obtaining the acrylic resin water dispersion (B) complying with the above-described requirement of the molecular weight, the method of imparting a cross-linked structure is effective. The cross-linked structure is a network structure which is chemically stable due to the chemical bonds between the backbone chains of the acrylic resin.

For the purpose of obtaining the acrylic resin water dispersion (B) complying with the above-described requirement of the molecular weight, it is preferable that the above-described method of controlling the generation of the radicals be combined with the method of imparting a cross-linked structure in terms of drying property, shielding property of the aqueous primer composition of the present invention.

The method of imparting the cross-linked structure, for example, includes a method of copolymerizing monomers having plural polymerizable unsaturated bonding groups per one molecule, a method of copolymerizing a silane coupling agent having polymerizable unsaturated bonding groups, among others.

In the method of copolymerizing monomers having plural polymerizable unsaturated bonding groups per one molecule, or the method of copolymerizing a silane coupling agent having polymerizable unsaturated bonding groups, it is preferable that the amount of these monomers, or the silane coupling agent be 0.05 to 10 parts by weight with respect to 100 parts by weight of the monomers having polymerizable unsaturated bonding groups in terms of drying property, shielding property of the aqueous primer composition of the present invention.

Also, with regard to the monomers having plural polymerizable unsaturated bonding groups per one molecule, monomers whose molecular chains between the contiguous polymerizable unsaturated bonding groups have a predetermined molecular weight are preferable because this can improve the drying property without deteriorating the shielding property. For example, the molecular weight of the molecular chains between the contiguous polymerizable unsaturated bonding groups is preferably 100 or more, more preferably 100 to 700.

The monomers having plural polymerizable unsaturated bonding groups per one molecule, for example, include diallyl phthalate; divinylbenzene; allyl acrylate; trimethylolpropane trimethacrylate; ethylene glycol dimethacrylate; diethylene glycol dimethacrylate; triethylene glycol dimethacrylate; polyethylene glycol dimethacrylate (the number of the ethylene glycol unit: 4 or more); polypropylene glycol dimethacrylate (the number of the propylene glycol unit: 1 or more);

Neopentyl glycol dimethacrylate; 1,3-butylene glycol dimethacrylate; 1,4-butanediol dimethacrylate; 3-methyl-1,5-pentanediol dimethacrylate; 1,6-hexanediol dimethacrylate; 1,9-nonanediol dimethacrylate; 2-methyl-1,8-octanediol dimethacrylate; 1,10-decanediol dimethacrylate; tricyclodecane dimethanol dimethacrylate; 2-hydroxy-1,3-dimethacryloxypropane; 2,2-bis[4-(methacryloxypolyethoxy)phenyl]propane (the number of the ethoxy unit: 2 or more); 2,4-diethyl-1,5-pentanediol dimethacrylate;

1,4-Cyclohexane dimethyl dimethacrylate; polyethylene glycol diacrylate (the number of the ethylene glycol unit: 1 or more); polypropylene glycol diacrylate (the number of the propylene glycol unit: 1 or more); neopentyl glycol diacrylate; 1,6-hexanediol diacrylate; 1,9-nonanediol diacrylate; 3-methyl-1,5-pentanediol diacrylate; 2-methyl-1,8-octanediol diacrylate; tricyclodecane dimethanol diacrylate; 2-hydroxy-1-acryloxy-3-methacryloxypropane; 2,2-bis[4-(acryloxypolyethoxy)phenyl]propane (the number of the ethoxy unit: 1 or more); 2,2-hydrogenated bis[4-(acryloxypolyethoxy)phenyl]propane (the number of the ethoxy unit: 1 or more);

2,2-bis[4-(acryloxypolypropoxy)phenyl]propane (the number of the propoxy unit: 1 or more); 2,4-diethyl-1,5-pentanediol diacrylate; or the like. These can be used alone or as a mixture of two or more kinds.

As examples of the silane coupling agents having polymerizable unsaturated bonding groups, silane compounds having unsaturated bonding groups such as γ-methacryloxypropyltrimethoxysilane, and γ-methacryloxypropyltriethoxysilane can be mentioned.

Also, the monomer having plural polymerizable unsaturated bonding groups per one molecule, and the silane coupling agent having polymerizable unsaturated bonding groups can be used in combination.

With regard to the acrylic resin in the acrylic resin water dispersion (B) used in the present invention, it is necessary for its glass transition temperature to be 15° C. to 130° C. in terms of drying property and shielding property. In particular, it is preferable that it be 25° C. to 100° C.

The glass transition temperature (hereinafter, abbreviated as "Tg") of the acrylic resin in the acrylic resin water dispersion (B) of the present invention is based on the value measured with a differential scanning calorimeter (hereinafter, abbreviated as "DSC").

As an acrylic resin in the acrylic resin water dispersion (B) used in the present invention, the above-described acrylic monomers can be used. However, the monomer having active-hydrogen containing groups which is reactive with isocyanate groups can be particularly used. The examples of the active-hydrogen containing groups reactive with isocyanate groups can include common functional groups, and the typical examples include a hydroxyl group, amino group, carboxyl group, phosphate group, phosphite group, sulfonate group, sulfinate group, mercapto group, silanol group, activated methylene group, carbamate group, ureide group, carboxylic acid amide group, sulfonic acid amide group, or the like. In particular, a hydroxyl group, amino group, carboxyl group, and activated methylene group are preferable because it is easy to incorporate them thereto. A hydroxyl group is more preferable. These active-hydrogen containing groups may be incorporated alone, or the two or more kinds may be incorporated.

The acrylic monomers having a hydroxyl group, for example, include (meth)acrylic acid esters having hydroxyl groups such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, methyl(2-hydroxymethyl) acrylate, ethyl(2-hydroxylmethyl) acrylate, butyl(2-hydroxylmethyl) acrylate, (4-hydroxymethylcyclohexyl)methyl (meth)acrylate, glycerol mono(meth)acrylate, phthalic acid mono(2-hydroxypropyl)-mono[2-(meth)acryloyloxy] ethyl ester, and 2-hydroxy-3-phenoxypropyl (meth)acrylate; and Mono(meth)acrylates of polyoxyalkylene glycol having hydroxyl groups such as polyethylene glycol mono(meth)acrylate, polypropylene glycol mono(meth)acrylate, and polybutylene glycol mono(meth)acrylate can be mentioned.

These monomers can be used alone or as a mixture of two or more kinds.

The hydroxyl value (mg KOH/g) of the acrylic resin in the acrylic resin water dispersion (B) is preferably 0 to 60, more preferably 0 to 35 in terms of the drying property and shielding property of the aqueous primer composition of the present invention.

The acrylic resin in the acrylic resin water dispersion (B) may be modified, according to necessity, with a resin such as a silicone resin, fluororesin, urethane resin and epoxy resin, or these resins can be blended.

According to necessity, a pigment, bulking agent, aggregate, dispersing agent, wetting agent, bodying agent and/or rheology control agent, antifoaming agent, antiseptic agent, antifreezing agent, antimicrobial agent, pH adjustor, rust-inhibitor, ultraviolet absorbing agent, anti-oxidizing agent, or the like can be blended into the acrylic resin water dispersion (B).

The aqueous primer composition of the present invention can be obtained by mixing the water-dispersible polyisocyanate (A), and the acrylic resin water dispersion (B) at a predetermined ratio, and by stirring them.

The weight ratio between the water-dispersible polyisocyanate (A) and the acrylic resin water dispersion (B) is (A):(B)=70:30 to 50:50 in the solid content, it is preferably (A):(B)=65:35 to 55:45 in terms of the adhesiveness to the inorganic substrate, drying property, and the effect to prevent the covering resin layers from bulging.

The methods of mixing the water-dispersible polyisocyanate (A) and the acrylic resin water dispersion (B) can include methods in which the acrylic resin water dispersion (B) is added to the water-dispersible polyisocyanate (A); the water-dispersible polyisocyanate (A) is added to the acrylic resin water dispersion (B); the water-dispersible polyisocyanate (A) dispersed in water is added to the acrylic resin water dispersion (B); or the acrylic resin dispersion (B) is added to the water-dispersible polyisocyanate (A) dispersed in water.

Also, a liquid mixture of the water-dispersible polyisocyanate (A), and the acrylic resin water dispersion (B) may be further diluted with water.

With regard to the methods of mixing the water-dispersible polyisocyanate (A) and the acrylic resin water dispersion (B), general stirring methods such as manual stirring with a paddle, and stirring with a hand mixer can be applied.

The method of surface-treating by using the aqueous primer composition of the present invention is a method in which the surfaces of the inorganic substrates used in civil engineering and construction are treated by coating them with the aqueous primer composition using a spray, brush, or the like.

The amount of the aqueous primer composition coated in the process of surface-treating varies with the kind of the inorganic substrate forming the base, but 0.1 to 1.0 kg of it is used per 1 $m^2$ in the case of the porous one such as concrete, and mortar. Furthermore, it is preferable that 7 to 45 g of the aqueous primer composition in its solid content be coated per 1 $m^2$ of the inorganic substrate in terms of the adhesiveness to the inorganic substrate, the drying property, and the effect to prevent the covering resin layer from bulging.

The laminated structure of the present invention is a laminated structure including at least three layers of the inorganic substrate layer, the resin layer formed with the above-described aqueous primer composition and a covering resin layer formed by any one of an epoxy resin, a urethane resin and a polymerizable unsaturated resin.

As an example of the epoxy resin which is commercially provided, "CHEMICRETE E" (a general-purpose epoxy resin produced by ABC TRADING CO., LTD.) can be mentioned.

As examples of the commercially provided urethane resins, "PLYADEK HF-3500" (a rigid urethane resin including a natural grease and/or derivative thereof, and a polyisocyanate compound, produced by DAINIPPON INK AND CHEMICALS, INCORPORATED), "PLYADEK PF-570"/"PLYADEK E-570" [a general-purpose urethane resin obtained by using a reaction of a prepolymer wherein TDI is added, with a active-hydrogen compound (PPG and/or 4,4'-diamino-3,3'-dichlorodiphenylmethane (MBOCA)), produced by DAINIPPON INK AND CHEMICALS, INCORPORATED] can be mentioned.

The above-mentioned polymerizable unsaturated resin, for example, can include those obtained from the following essential components: a polymerizable resin selected from a urethane (meth)acrylate resin, epoxy (meth)acrylate resin, and polyester (meth)acrylate resin; and/or an unsaturated polyester resin obtained from a condensation reaction of a dibasic acid such as an α,β-unsaturated dibasic acid with a polyvalent alcohol; and a monomer having radical polymerizable unsaturated groups. As examples of their commercially-available products, "DIOVAR HTP-563" (a polymerizable resin, produced by DAINIPPON INK AND CHEMICALS, INCORPORATED), "POLYLITE FR-200"

(an unsaturated polyester resin, produced by DAINIPPON INK AND CHEMICALS, INCORPORATED), or the like can be mentioned.

As examples of the above-mentioned inorganic substrates, those made by using cement generally used in civil engineering and construction, or the like (i.e. concrete, mortar, or the like) can be mentioned. In particular, the aqueous primer composition of the present invention is excellent in its drying property. Therefore, it is suitable for use in a workshop, and can be applicable to an inorganic substrate such as a building frame of concrete, etc.

EXAMPLES

Hereinafter, the present invention is further explained by using examples in detail. However, the present invention is not limited to these examples. In addition, "part" represents "part by weight".

Reference Example 1

Preparation of Vinyl Polymer Having Active Hydrogen-containing Groups (q-1)

429 parts of diethylene glycol diethyl ether (hereinafter, abbreviated as "EDE") were charged in a four-necked flask equipped with a stirrer, temperature indicator, cooling tube, and nitrogen-injecting vessel. After heating at 110° C. in a nitrogen stream, a liquid mixture including 500 parts of methoxypolyethylene glycol methacrylate (having nine oxyethylene units per one molecule on the average, hereinafter abbreviated as "MPEGMA-1"), 300 parts of methyl methacrylate (hereinafter, abbreviated as "MMA"), 50 parts of 2-hydroxyethyl methacrylate (hereinafter, abbreviated as "2-HEMA"), 150 parts of cyclohexyl methacrylate (hereinafter, abbreviated as "CHMA"), 45 parts of t-butylperoxy-2-ethylhexanoate, and 5 parts of t-butylperoxybenzoate was added dropwise thereto for five hours. After the addition, the reaction was conducted at 110° C. for nine hours, and a solution of the acrylic polymer whose solid content was 70% was obtained. Hereinafter, this is called "vinyl polymer having active-hydrogen containing groups (q-1)".

Reference Example 2

Preparation of Water-dispersible Polyisocyanate (a-1)

Into the same reaction equipment as in Reference Example 1 were charged 200 parts of "BERNOCK DN-980S" [a HDI isocyanurate-based hydrophobic polyisocyanate; isocyanurate-group-content (hereinafter, abbreviated as "NCO-group content") 21%; the average number of NCO functional groups: about 3.6; the solid content 100%; produced by DAINIPPON INK AND CHEMICALS, INCORPORATED], and 100 parts of the vinyl polymer having active hydrogen-containing groups (q-1). After heating at 90° C. in a nitrogen stream, the reaction was conducted at the same temperature for six hours while stirring. A water-dispersible polyisocyanate composition was obtained, whose solid content was 90%, and whose NCO-group content was 13%. Hereinafter, this is called "polyisocyanate composition (a-1)".

Reference Example 3

Preparation of Acrylic Resin Water Dispersion (b-1)

Into the same reaction equipment as in Reference Example 1 were charged 400 parts of ion-exchanged water, and 7 parts of "NEWCOL 707SF" (an anionic emulsifying agent whose solid content is 30%, produced by NIPPON NYUKAZAI CO., LTD), these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 122.5 parts of butyl acrylate (hereinafter, abbreviated as "BA"), 217 parts of MMA, 0.5 parts of methacrylic acid (hereinafter, abbreviated as "MAA"), and 3.5 parts of methacryloxytrimethoxysilane (hereinafter, abbreviated as "MTMS"); and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The PH was adjusted at 7.5 by using 25% aqueous ammonia, ion-exchanged water was then added, and an acrylic resin water dispersion (b-1) was obtained, whose solid content was 5.0% by weight, and whose weight average molecular weight was 500,000 or more.

Reference Example 4

Preparation of Acrylic Resin Water Dispersion (b-2)

Into the same reaction equipment as in Reference Example 1 were charged 400 parts of ion-exchanged water, and 7 parts of NEWCOL 707SF, these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 113.4 parts of BA, 198.1 parts of MMA, 10.5 parts of MAA, and 28 parts of 2-HEMA; and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The PH was adjusted at 7.5 by using 25% aqueous ammonia, ion-exchanged water was then added, and an acrylic resin water dispersion (b-2) was obtained, whose solid content was 5.0% by weight, and whose weight average molecular weight was 420,000.

Reference Example 5

Preparation of Acrylic Resin Water Dispersion (b-3)

Into the same reaction equipment as in Reference Example 1 were charged 400 parts of ion-exchanged water, and 7 parts of NEWCOL 707SF, these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 119 parts of BA, 204.4 parts of MMA, 10.5 parts of MAA, 16.1 parts of 2-HEMA, and 3.5 parts of MTMS; and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The PH was adjusted at 7.5 by using 25% aqueous ammonia, ion-exchanged water was then added, and an acrylic resin water dispersion (b-3) was obtained, whose solid content was 5.0% by weight, and whose weight average molecular weight was 500,000 or more.

Reference Example 6

Preparation of Acrylic Resin Water Dispersion (b-4)

Into the same reaction equipment as in Reference Example 1 were charged 400 parts of ion-exchanged water, and 7 parts of NEWCOL 707SF, these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 115.5 parts of BA, 161 parts of MMA, 10.5 parts of MAA, 40.6 parts of 2-HEMA, 35 parts of styrene and 3.5 parts of MTMS; and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The pH was adjusted at 7.5 by using 25% aqueous ammonia, ion-exchanged water was then added, and an acrylic resin water dispersion (b-4) was obtained, whose solid content was 5.0% by weight, and whose weight average molecular weight was 500,000 or more.

Reference Example 7

Preparation of Acrylic Resin Water Dispersion (b-5)

Into the same reaction equipment as in Reference Example 1 were charged 400 parts of ion-exchanged water, and 7 parts of NEWCOL 707SF, these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 47.6 parts of BA, 263.9 parts of MMA, 10.5 parts of MAA, and 28 parts of 2-HEMA; and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The pH was adjusted at 7.5 by using 25% aqueous ammonia, ion-exchanged water was then added, and an acrylic resin water dispersion (b-5) was obtained, whose solid content was 5.0% by weight, and whose weight average molecular weight was 410,000.

Reference Example 8

Preparation of Acrylic Resin Water Dispersion (b-6)

Into the same reaction equipment as in Reference Example 1 were charged 400 parts of ion-exchanged water, and 7 parts of NEWCOL 707SF, these were stirred, and heated to 80° C. 0.70 parts of sodium persulfate was added thereto. A monomer mixture prepared separately by way of stirring and emulsifying 70 parts of ion-exchanged water, 17.5 parts of NEWCOL 707SF, 121.1 parts of BA, 218.4 parts of MMA, 10.5 parts of MAA, and 3.5 parts of lauryl mercaptan; and a mixture of 0.70 parts of sodium persulfate, and 7 parts of ion-exchanged water were added dropwise separately for three hours while keeping the reaction temperature at 78° C. to 80° C. A mixture of 0.70 parts of sodium persulfate, and 28 parts of ion-exchanged water was further added while keeping at the same temperature, further maintained at the same temperature for four hours, and then, cooled to room temperature. The pH was adjusted at 7.5 by using 25% aqueous ammonia, ion-exchanged water was then added, and an acrylic resin water dispersion (b-6) was obtained, whose solid content was 5.0% by weight, and whose weight average molecular weight was 240,000.

Reference Example 9

Preparation of Acrylic Resin Water Dispersion (b-7)

Into the same reaction equipment as in Reference Example 1 were charged 400 parts of ion-exchanged water, and 7 parts of NEWCOL 707SF, these were stirred, and heated to 80° C. 0.35 parts of sodium persulfate were added thereto. A monomer mixture prepared separately by way of stirring and emulsifying 70 parts of ion-exchanged water, 17.5 parts of NEWCOL 707SF, 178.5 parts of BA, 161.0 parts of MMA, 10.5 parts of MAA, and 3.5 parts of MTMS; and a mixture of 0.35 parts of sodium persulfate, and 7 parts of ion-exchanged water were added dropwise separately for three hours while keeping the reaction temperature at 78° C. to 80° C. A mixture of 0.35 parts of sodium persulfate, and 28 parts of ion-exchanged water was further added while keeping at the same temperature, further maintained at the same temperature for four hours, and then, cooled to room temperature. The pH was adjusted at 7.5 by using 25% aqueous ammonia, ion-exchanged water was then added, and an acrylic resin water dispersion (b-7) was obtained, whose solid content was 5.0% by weight, and whose weight average molecular weight was 500,000 or more.

Reference Example 10

Preparation of Acrylic Resin Water Dispersion (b-8)

500 parts of the acrylic resin water dispersion (b-1) were diluted by adding 500 parts of ion-exchanged water, and an acrylic resin water dispersion (b-8) was obtained, whose solid content was 2.5% by weight, and whose weight average molecular weight was 500,000 or more.

<Measurement of Tg of Acrylic Resin in Acrylic Resin Water Dispersion>

The measurement was carried out based on JIS K 7121 (a method of measuring transition temperature of plastics). The acrylic resin water dispersions obtained in Reference Examples were loaded into a differential scanning calorimeter as specimens, heated to the temperature of (Tg+50° C.) at a programming rate of 10° C./minute, kept at the temperature for three minutes, and then, cooled rapidly. Their Tgs were interpreted from the obtained DSC curves.

Examples 1 to 9 and Comparative Examples 1 to 4

Each of primer compositions was obtained by mixing the water-dispersible polyisocyanate with each of the acrylic resin water dispersions obtained in Reference Examples. Laminated structures were produced by using these primer compositions, and these laminated structures were evaluated in terms of adhesiveness and bulging-resistant property.

Substrate layer: a flat plate of paving concrete (60 mm thick×300 mm×300 mm)

The above flat plate of concrete was coated with each of the primer compositions, and a piece of "DIC CROSS", namely a reinforcing material (a fiberglass net, produced by DAINIPPON INK AND CHEMICALS, INCORPORATED) was laid thereon after the primer composition was dried. It was then coated with "PLYADEK HF-3500" (rigid polyurethane resin, produced by DAINIPPON INK AND CHEMICALS, INCORPORATED) as a covering layer 2 mm thick by way of a common treatment, and it was aged under the conditions of the temperature of 23° C. and the humidity of 50% for seven days.

<Method of Evaluating Drying Property>

Under the conditions of the temperature of 23° C. and the humidity of 50%, the ground substrate was coated with the primer by using a roller or brush at the rate of 0.15 kg/m², and the "tack-free time" was studied.

"Good" representing that the tack-free time is four hours or less, "Fair" representing over four hours and less than eight hours, and "Bad" representing eight hours or more.

"Tack-free" refers to the state of being tack-free, and the tack-free time was obtained by measuring the time after primer was coated required for the primer not to stick to the fingertips when touching the surface of the primer.

<Method of Evaluating Adhesiveness>

Within thirty minutes after the state of being tack-free of the primer was confirmed, the covering resin layer was laid thereon, and the laminated structure obtained by curing it was supplied as a test sample.

In the adhesion test, they were cut into rectangles 25 mm wide, these were evaluated for adhesiveness by calculating the average peel adhesive force (n=3, unit: N/25 mm) at the angle of 90°. At this point, it was confirmed weather each of the parts was destroyed or not. In the Tables below, it was shown as follows: "substrate destroyed" representing the destruction in the inorganic substrate, "covering layer destroyed" representing the destruction in the covering resin layer, and "primer destroyed" representing the destruction in the primer layer.

<Method of Evaluating Bulging-resistant Property>

A half portion of each above-described test sample was soaked in water at room temperature, and this was allowed to stand for sixteen hours. Then, this was subjected to seven cycles of soaking in water at 60° C. for eight hours, and soaking in water at room temperature for sixteen hours. After that, this was evaluated by calculating the ratio of the bulging area generated on the surface of the covering resin layer.

"Excellent" representing that the ratio of the bulging area was less than 5%, "Good" representing 5% to less than 20%, "Fair" representing 20% to less than 35%, "Bad" representing 35% to less than 50%, and "Very Bad" representing 50% or more.

The results of the evaluation are shown in Tables 1 to 4.

TABLE 1

|  |  | Example 1 | Example 2 | Example 3 | Example 4 |
|---|---|---|---|---|---|
| Content (A) | (a-1) | 10 | 10 | 10 | 10 |
| Content (B) | (b-1) | 110 | — | — | — |
|  | (b-2) | — | 110 | — | — |
|  | (b-3) | — | — | 110 | — |
|  | (b-4) | — | — | — | 110 |
| Weight average molecular weight of content (B) |  | 500,000 or more | 420,000 | 500,000 or more | 500,000 or more |
| Tg (° C.) of content (B) |  | 44 | 45 | 44 | 44 |
| Hydroxyl value of content (B) (mgKOH/g) |  | 0 | 35 | 20 | 50 |
| Weight ratio: content (A)/content (B) in solid content |  | 6/4 | 6/4 | 6/4 | 6/4 |
| Amount coated in solid content (g/m²) |  | 16 | 16 | 16 | 16 |
| Property | Drying property (tack-free time; hour) | Good (3) | Good (3.5) | Good (2.5) | Good (2) |
|  | Bulging-resistant property | Excellent | Good | Excellent | Good |
|  | Adhesiveness (N/25 mm) | 100 substrate destroyed | 98 substrate destroyed | 110 substrate destroyed | 105 substrate destroyed |

In Tables, the content (A) represents the water-dispersible polyisocyanate and the content (B) represents the acrylic resin water dispersion.

TABLE 2

|  |  | Example 5 | Example 6 | Example 7 | Example 8 |
|---|---|---|---|---|---|
| Content (A) | (a-1) | 9.0 | 6.4 | 10 | 10 |
| Content (B) | (b-1) | — | 110 | — | 110 |
|  | (b-8) | 106 | — | — | — |
|  | (b-5) | — | — | 110 | — |
| Weight average molecular weight of content (B) |  | 500,000 or more | 500,000 or more | 410,000 | 500,000 or more |
| Tg (° C.) of content (B) |  | 44 | 44 | 96 | 44 |
| Hydroxyl value of content (B) (mgKOH/g) |  | 0 | 0 | 35 | 0 |

TABLE 2-continued

|  |  | Example 5 | Example 6 | Example 7 | Example 8 |
|---|---|---|---|---|---|
| Weight ratio: content (A)/content (B) in solid content | | 7/3 | 5/5 | 6/4 | 6/4 |
| Amount coated in solid content (g/m$^2$) | | 16 | 16 | 16 | 40 |
| Property | Drying property (tack-free time; hour) | Good (3.5) | Good (1.5) | Good (3) | Good (4) |
|  | Bulging-resistant property | Good | Excellent | Good | Good |
|  | Adhesiveness (N/25 mm) | 120 substrate destroyed | 55 substrate destroyed | 100 substrate destroyed | 89 substrate destroyed |

TABLE 3

|  |  | Example 9 |
|---|---|---|
| Content (A) | (a-1) | 10 |
| Content (B) | (b-1) | 110 |
|  | (b-6) | — |
|  | (b-7) | — |
| Weight average molecular weight of content (B) | | 500,000 or more |
| Tg (° C.) of content (B) | | 44 |
| Hydroxyl value of content (B) (mgKOH/g) | | 0 |
| Weight ratio: content (A)/content (B) in solid content | | 6/4 |
| Amount coated in solid content (g/m$^2$) | | 8 |
| Property | Drying property (tack-free time; hour) | Good (1.5) |
|  | Bulging-resistant property | Good |
|  | Adhesiveness (N/25 mm) | 98 substrate destroyed |

TABLE 4

|  |  | Comparative Example 1 | Comparative Example 2 | Comparative Example 3 | Comparative Example 4 |
|---|---|---|---|---|---|
| Content (A) | (a-1) | 10 | 10 | 10 | — |
| Content (B) | (b-6) | 110 | — | — | — |
|  | (b-7) | — | 110 | — | — |
|  | (b-1) | — | — | — | 110 |
| Water | | — | — | 100 | — |
| Weight average molecular weight of content (B) | | 240,000 | 500,000 or more | — | 500,000 or more |
| Tg (° C.) of content (B) | | 45 | 10 | — | 44 |
| Hydroxyl value of content (B) (mgKOH/g) | | 0 | 0 | — | 0 |
| Weight ratio: content (A)/content (B) in solid content | | 6/4 | 6/4 | 10/0 | 0/10 |
| Amount coated in solid content (g/m$^2$) | | 16 | 16 | 16 | 16 |
| Property | Drying property (tack-free time; hour) | Good (4) | Bad (16) | Bad (48) | Good (0.5) |
|  | Bulging-resistant property | Very Bad | Excellent | Very Bad | Very Bad |
|  | Adhesiveness (N/25 mm) | 95 Covering layer destroyed | 115 Covering layer destroyed | 115 Covering layer destroyed | 5.0 Primer destroyed |

In Comparative Example 1, the weight average molecular weight of the acrylic resin (content (B)) was small, so it was inferior in the bulging-resistant property. In Comparative Example 2, the Tg of the content (B) was low, and it was impossible to speed up the laying operation because the drying time was long. Also, in Comparative Example 3, it was inferior in drying property and bulging-resistant property because the water-dispersible polyisocyanate was just diluted with water. Furthermore, in Comparative Example 4, it was inferior in the adhesiveness to the substrate, and in the bulging-resistant property because the water-dispersible acrylic resin was used alone, and it was inferior in the permeability into the substrate.

INDUSTRIAL APPLICABILITY

The aqueous primer composition of the present invention is useful for a surface treatment of inorganic substrates used in civil engineering and construction such as roofs, walls, floors, and roads because it can speed up the process of surface-treating and can alleviate the odorous problem, and is also excellent in adhesiveness to inorganic substrates, the effect to prevent the covering resin layers from bulging, and drying property. That is, the aqueous primer composition of the present invention is industrially useful because it can provide a highly reliable laminated structure.

The invention claimed is:
1. An aqueous primer composition, comprising:
a water-dispersible polyisocyanate (A); and
an acrylic resin water dispersion (B),
wherein a polystyrene equivalent weight average molecular weight, determined using gel permeation chromatography, of an acrylic resin in the acrylic resin water dispersion (B) is 350,000 or more,
a glass transition temperature, determined by using a differential scanning calorimeter, of the acrylic resin is 15° C. to 130° C., and a weight ratio between the water-dispersible polyisocyanate (A) and the acrylic resin water dispersion (B) is (A):(B)=70:30 to 50:50 in solid content.

2. The aqueous primer composition according to claim 1, wherein a hydroxyl value of the acrylic resin in the acrylic resin water dispersion (B) is 0 to 60.

3. The aqueous primer composition according to claim 1, wherein the water-dispersible polyisocyanate (A) is a mixture of a hydrophobic polyisocyanate (A1) and a hydrophilic polyisocyanate (A2), and a weight mixing ratio between the hydrophobic polyisocyanate (A1) and the hydrophilic polyisocyanate (A2) is (A1):(A2)=9:1 to 5:5.

4. The aqueous primer composition according to claim 3, wherein the hydrophilic polyisocyanate (A2) is a vinyl polymer having an isocyanate group and a hydrophilic group.

5. The aqueous primer composition according to claim 4, wherein the vinyl polymer is an acrylic polymer having a weight average molecular weight of 2,000 to 100,000.

6. The aqueous primer composition according to claim 4, wherein the hydrophilic group of the vinyl polymer is a non-ionic group.

7. A method of surface-treating an inorganic substrate, comprising: coating
an inorganic substrate used in civil engineering and construction with the aqueous primer composition according to claim 1.

8. A laminated structure, comprising:
a layer of an inorganic substrate used in civil engineering and construction;
a resin layer formed on the layer of the inorganic substrate with the aqueous primer composition according to claim 1; and
a covering resin layer formed on the resin layer with any one of an epoxy resin, a urethane resin, and a polymerizable unsaturated resin.

* * * * *